(12) United States Patent
Perumalla et al.

(10) Patent No.: US 12,067,482 B1
(45) Date of Patent: Aug. 20, 2024

(54) INTELLIGENT INPUT ADAPTATION FROM DISPARATE DATA SOURCES FOR HETEROGENEOUS MACHINE LEARNING MODEL EXECUTION

(71) Applicant: Amazon Technologies, Inc., Seattle, WA (US)

(72) Inventors: Poorna Chand Srinivas Perumalla, Seattle, WA (US); Nagajyothi Nookula, Seattle, WA (US); Aashish Jindia, San Francisco, CA (US); Vinay Hanumaiah, San Jose, CA (US); Eduardo Manuel Calleja, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1933 days.

(21) Appl. No.: 15/888,615

(22) Filed: Feb. 5, 2018

(51) Int. Cl.
   G06F 18/25      (2023.01)
   G06F 18/21      (2023.01)
   G06N 3/044      (2023.01)
   G06N 3/08       (2023.01)
   H04L 67/12      (2022.01)

(52) U.S. Cl.
   CPC .......... G06N 3/08 (2013.01); G06F 18/2193 (2023.01); G06F 18/251 (2023.01); G06N 3/044 (2023.01); H04L 67/12 (2013.01)

(58) Field of Classification Search
   CPC ........ G06N 3/08; G06N 3/044; G06N 3/0445; G06K 9/6265; G06K 9/6289; H04L 67/12; G06F 18/2193; G06F 18/251
   See application file for complete search history.

(56) References Cited

U.S. PATENT DOCUMENTS

| | | | | |
|---|---|---|---|---|
| 5,596,659 A * | 1/1997 | Normile | ................. | G06T 9/008 |
| | | | | 382/253 |
| 6,243,696 B1 * | 6/2001 | Keeler | ................. | G06N 3/049 |
| | | | | 706/907 |
| 8,694,540 B1 * | 4/2014 | Lin | ........................ | G06F 16/211 |
| | | | | 707/777 |
| 2013/0055027 A1 * | 2/2013 | Ma | ........................ | G06F 11/263 |
| | | | | 714/33 |
| 2018/0035082 A1 * | 2/2018 | Patil | .................... | G06V 40/171 |
| 2018/0174053 A1 * | 6/2018 | Lin | ........................ | G06N 3/063 |
| 2021/0056050 A1 * | 2/2021 | Yamato | ................. | G06F 13/126 |

* cited by examiner

*Primary Examiner* — Marcos L Torres
(74) *Attorney, Agent, or Firm* — Nicholson De Vos Webster & Elliott LLP

(57) ABSTRACT

Techniques for input adaptation from disparate data sources for heterogeneous machine learning model execution are described. A preprocessing adapter can perform preprocessing of data obtained from edge devices to suit the input data characteristic requirements of one or more machine learning (ML) models. The preprocessing adapter can determine the input data characteristic requirements in a variety of ways, such as via analysis of the input layer of a ML model or through data variation testing and associated feedback resulting from output data generated by the ML model.

20 Claims, 11 Drawing Sheets

INTELLIGENT INPUT ADAPTATION FROM DISPARATE DATA SOURCES FOR HETEROGENEOUS MACHINE LEARNING MODEL EXECUTION

BACKGROUND

The field of machine learning has become widely acknowledged as a likely significant driver of the future of technology. Organizations everywhere now seek to use machine learning techniques to address a wide variety of problems, such as optimizing aspects of their products, processes, customer experience, etc. While the high-level view of machine learning sounds simple—e.g., provide training data to a computer, to allow the computer to automatically learn from the training data to generate a model that can make predictions for other data—implementing machine learning techniques in practice can be tremendously difficult.

This difficulty is partially due to the underlying algorithmic and mathematical complexities of machine learning algorithms, which are typically developed by academic researchers or individuals at the forefront of the field. Additionally, it is also difficult to generate, update, and deploy useful models, which can be extremely time and resource consumptive and filled with complexities. Moreover, machine learning models tend to be extremely focused on particular use cases and operating environments, and thus any change to the underlying environment or use case may require a complete regeneration of a new model. Further, constructing and deploying machine learning technologies is quite different from traditional software engineering, and requires practices and architectures different from what traditional software engineering development teams are familiar with.

BRIEF DESCRIPTION OF DRAWINGS

Various embodiments in accordance with the present disclosure will be described with reference to the drawings, in which.

DETAILED DESCRIPTION

Figure 1:
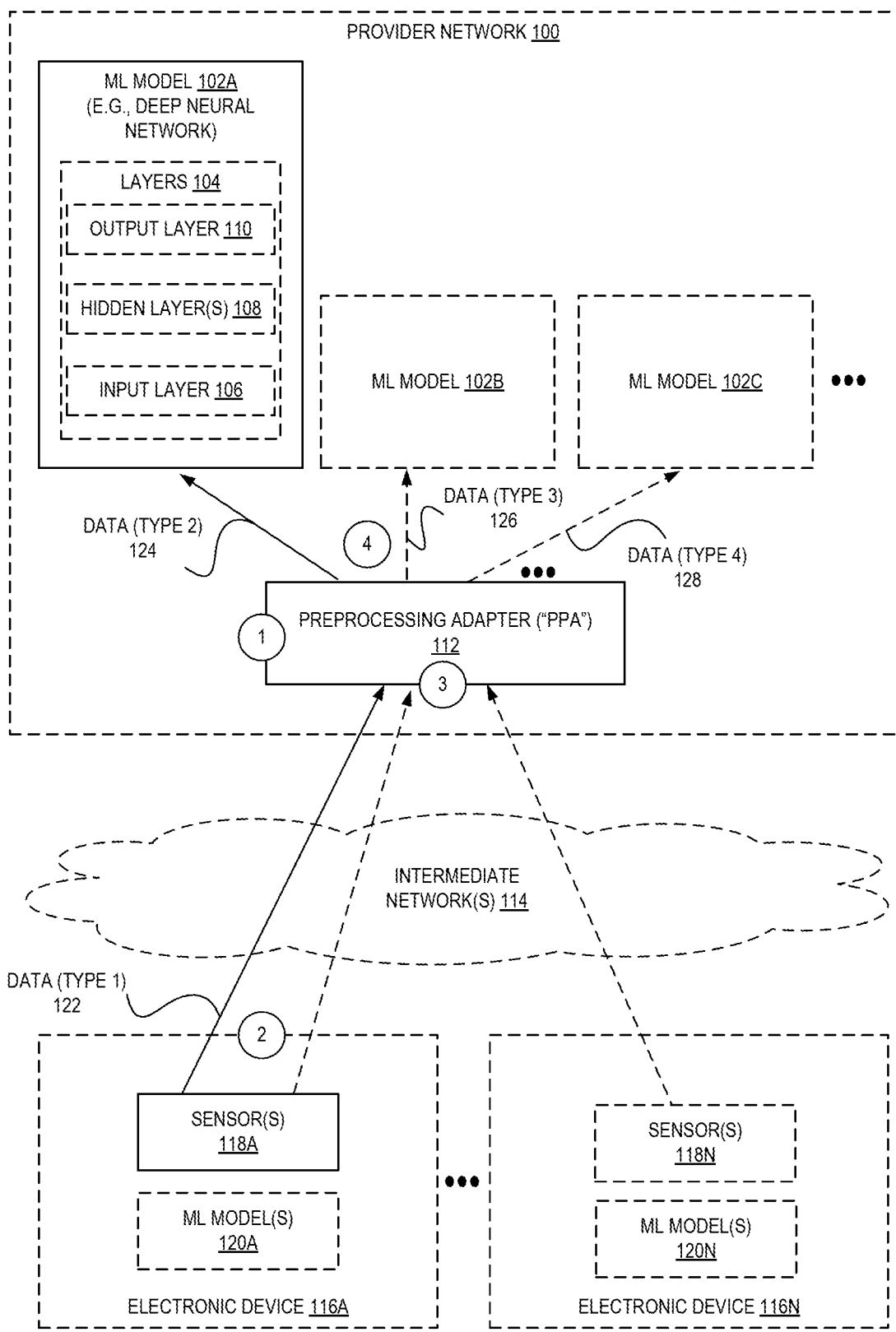
FIG. 1 is a diagram illustrating an environment for input adaptation from disparate data sources for heterogeneous machine learning model execution according to some embodiments.

Various embodiments of methods, apparatus, systems, and non-transitory computer-readable storage media for input adaptation from disparate data sources for heterogeneous machine learning model execution are described. According to some embodiments, a preprocessing adapter can perform preprocessing for data before being it is provided to one or more machine learning (ML) models. The preprocessing adapter can determine how the data needs to be preprocessed, and thus a set of preprocessing operations, by determining characteristics of the input for each of the one or more ML models. In various embodiments, the preprocessing adapter can determine the characteristics of the input required for a ML model by being provided such information by a requesting user, by performing analysis of one or more data structures of the ML model such as an input layer, by intelligently sending various types of input data to the ML model and utilizing feedback generated by the ML model, etc. The data may be provided by one or more "edge" electronic devices in a first format, and the preprocessing adapter can seamlessly convert the data of the first format into one or more multiple different formats, via preprocessing operations, to be used with one or more ML models. In some embodiments, a user can thus utilize one or multiple ML models that may be developed by others and thus, not designed with the edge device and/or particular use case in mind in which the user's data was captured (e.g., by an edge device). Moreover, the user may beneficially be relived of the need to have visibility or insight into what specific types of input data the one or more ML models accept, and thus, be relived of the burden of needing to implement model-specific preprocessing (and supporting systems) on their own.

As discussed herein, machine learning and data analysis algorithms can be useful in many domains, such as in medical image analysis, insurance, fraud detection, social networking (e.g., image and text understanding, graph analysis), security monitoring, etc. With advances in artificial intelligence and related applications, more and more users seek to engage with these systems.

For example, the recent but widespread deployment of "edge" electronic devices (typically having one or multiple types of sensors) such as smart cameras, smart speakers, smart doorbells, smart phones, medical devices (e.g., electrocardiogram monitors), etc., has led to a similar widespread utilization of ML models to perform a variety of tasks such as speech recognition, image detection and/or recognition, pattern recognition, etc.

An ML model typically accepts input having a particular type or format adhering to some set of characteristics. For example, an ML model may accept image input data of a particular encoding, of a particular size (e.g., 20 pixels by 20 pixels, 300 pixels by 300 pixels, etc.), etc. Some ML models include multiple layers, which can include a first layer that defines what the input parameters are for the model. In other cases, the input characteristics for a model may be specified in other ways, such as through documentation or another information source.

Accordingly, to utilize an ML model, a user must provide input data in the format required by the model. In some cases, this may not be an issue as the model might have been specifically created to accept input data that matches the native output of a particular device. However, users may wish to utilize existing ML models with different devices, where the ML models may not have been specifically created for these specific devices. For example, as there are many types of edge devices with various types of components, the type of data generated by an edge device may not match the characteristics of the input data expected by the ML model. In such cases, the device is not fundamentally aware of the existence of the model or the type of input it accepts, and thus will not perform any preprocessing to align its output with that of the model. As a result, users may need to manually develop and implement complex systems to perform preprocessing on data (e.g., generated by a sensor or sensors, acquired via a network interface, etc.) to enable particular devices to make use of particular ML models.

Further, as many types of edge devices have relatively limited resource capabilities (e.g., processing ability, memory, storage capability, power availability), it is not desirable—or in many cases, possible—for these devices to perform such preprocessing operations and/or execute robust, sophisticated ML models. Thus, edge devices may typically be arranged to capture data (e.g., audiovisual data, image data, audio data, temperature or humidity data, biometric data, etc.) using one or more sensors and send the data to a separate location (e.g., a cloud provider network, or some other remote electronic device(s)) for inference to be performed using one or more ML models. To this end, relatively complex machine learning models are typically centrally (e.g., within a cloud network) trained and utilized, and thus a central server (or servers) may aggregate a potentially large number of data streams (from one or many sources) and run one or many ML models. Thus, users may need to manually develop and implement some sort of local and/or remote (e.g., cloud based) system to perform preprocessing.

Moreover, in some environments it may be possible to deploy ML models (or portions of ML models) to edge devices, such as when an edge device has sufficient computational resources, etc., to run a ML model and/or perform preprocessing. In this case, though, a mismatch between the native data generated by the device and the type of data accepted by the ML model may still exist, and thus the user must still develop and deploy a custom preprocessing system to eliminate the mismatch.

These problems resulting from a mismatch between the data that is to be used as input data for the model, and the type of input data expected by the model, are further magnified in scenarios in which multiple ML models are sought to be used, or when a new version of a ML model (expecting different input data) is sought to be used. In these cases, a user may need to construct model-specific data preprocessors for every new or different ML model involved.

Accordingly, in embodiments described herein, a preprocessing adapter can be utilized that can determine which preprocessing operations can be performed upon input data to yield data of an appropriate format for use as input data for one or more ML models and perform those preprocessing operations. The preprocessing adapter can determine the type of input data accepted by one or more ML models in a variety of ways in various embodiments, and thus determine which preprocessing operations are to be performed based on the determined type of input for the model(s). The preprocessing adapter can thereafter perform preprocessing to adapt the data into data of the needed type and provide the preprocessed data to the one or more ML models for inference.

FIG. 1 is a diagram illustrating an environment for input adaptation from disparate data sources for heterogeneous machine learning model execution according to some embodiments. As shown in FIG. 1, a preprocessing adapter 112 (or "PPA") can be implemented to preprocess data 122 from one or more sensors 118A-118N (possibly of one or multiple electronic devices 116A-116N) so that it is of an appropriate format to be used as input data for one or more ML models 102A-102C. The PPA 112 in some embodiments comprises a software module executed by an electronic device, though in some embodiments the PPA 112 can be implemented in hardware alone or as a combination of hardware and software.

The PPA 112 can be flexibly deployed in different locations in different embodiments. For example, in some embodiments the PPA 112 can be deployed within a same electronic device 116A as the sensor(s) 118 generating data, which may further optionally include one or more ML models 102A. As another example—as shown using dashed lines—the PPA 112 may be implemented within a provider network 100 along with one or multiple ML models 102A-102C while the electronic devices 116A-116N that generate data for the models may be outside of the provider network 100. For example, a user with an electronic device 116A can make use of a PPA 112 to be able to utilize ML models 102A-102C that may have been developed by other users (or provided by the provider network 100 itself), without needing to be concerned with the particular input type formats needed for these models—instead, the PPA 112 can discover and/or perform preprocessing for the user's data.

A provider network 100 provides users the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage), network-related resources (e.g., configuring virtual networks including groups of compute resources, content delivery networks (CDNs), Domain Name Service (DNS)), application resources (e.g., databases, application build/deployment services), etc. These and other computing resources may be provided as services, such as a hardware virtualization service that can execute compute instances, a storage virtualization service that can store data objects, a machine learning service that trains and/or executes ML models, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 114 (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to its customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

The electronic devices 116A-116N can be "edge" electronic devices as described herein, and each may have one or more sensors 118A-118N such as optical sensors, audio sensors (e.g., microphones), biological sensors, receivers of electromagnetic waves (e.g., radios), or other types of environmental sensors, that could "sense" light, moisture, acceleration, sound, temperature, pressure, flow, proximity, gas, chemicals, bioelectric signals, etc.

Each of the sensors 118 may directly generate data in a particular format to result in data 122 of the first type, or the electronic device 116A may perform some amount of transformation/adjustment of the raw data generated by the sensors 118 to result in data 122 of the first type. As one example, an optical sensor stack may generate an image in the form of a 224 by 224 by 3 tensor that comprises an Red Green Blue (RGB) representation of an image, though a huge number of variations exist of other data types that can be generated by sensors. As another example, raw output from sensor(s) 118A may be fed through an on-device ML model 120A (e.g., a full ML model or perhaps a portion of a model) to result in output data 122.

The ML models 102A-102C can be of a variety of types and complexities used for binary classification, multiclass classification, regression, etc., and be based on algorithms implementing linear regression, logistic regression, k-means clustering, principal component analysis (PCA), factorization machines, neural topic modeling, latent dirichlet allocation (LDA), gradient boosted trees, sequence-to-sequence, time series forecasting, word2vec, image classification, "deep" neural networks such as recurrent neural networks (RRN) or convolutional neural networks (CNN), etc. Although the outputs (or inferences) from the ML models 102 are not illustrated, such output data may be provided back to the user, back to the electronic devices 116, back to another system/server (optionally within the provider network), to other ML models (as inputs), etc.

For example, in some embodiments a ML model 102A may be neural network having multiple layers 104, such as an input layer 106, one or more hidden layers 108, an output layer 110, etc. As a more specific example, a model may be a CNN including convolutions at the outsets (of the input sensor data), possibly one or more nonlinear activation layers, pooling/downsampling, one or (typically) multiple fully-connected layers at the middle that serve to "contract" the data, and/or a layer of sampling (or "de-convolution") to bring the data back to the original input data size. Such a model may have a variety of types of "tunable" parameters (e.g., hyperparameters, model parameters) known to those of skill in the art that can be set/adjusted to modify how the model is trained, such as values for a learning rate (that controls how much to update the weight in the optimization algorithm), a number of epochs (the number of times the entire training set passes through the neural network), a batch size, an activation function, a number of hidden layers/units, a specific type of the model, weights, a dropout for regularization, etc.

Figure 2:
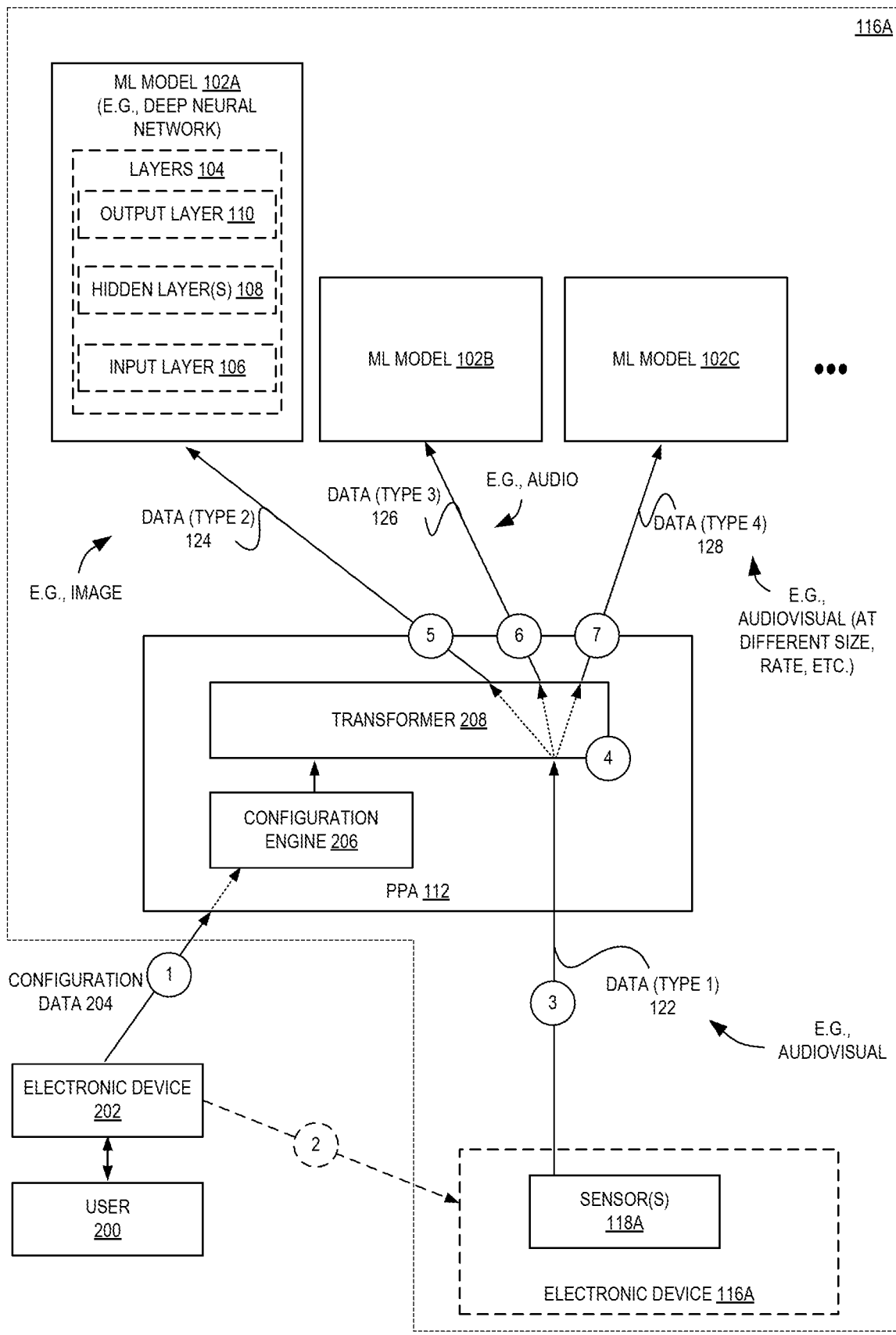
FIG. 2 is a diagram illustrating an environment for input adaptation from disparate data sources for heterogeneous machine learning model execution using user-specific transformation configuration data according to some embodiments.

To perform auto-preprocessing operations, the PPA 112, at circle '1', determines a type of input data accepted by one or more ML models 102. This determination may occur in response to a request (not illustrated) sent on behalf of a user to have the PPA 112 perform preprocessing for (and distribution of preprocessed data to) the one or more ML models 102, or this determination may also occur at another (e.g., earlier) point in time—for example, during a discovery phase in which the PPA 112 makes the determination for ML models existing in the provider network 100 that it has not yet analyzed. Such a request may be issued as an application programming interface (API) call (e.g., an HyperText Transfer Protocol (HTTP) GET or POST request) sent to an endpoint of a provider network 100, where an interface (e.g., part of a control plane) of the provider network 100 may cause the request (or other data indicative of the request) to be provided to the PPA 112. In various embodiments, the request includes different types of information, such one or more of an identifier of one or more specific ML models, and optionally identifiers of particular characteristics of the input data accepted by these one or more specific ML models. Further exemplary embodiments detailing the contents of such request message and the use of such messages by the PPA 112 will be described later herein with regard to FIGS. 2-4.

At circle '2', data 122 from one or more sensors 118A-118N (or electronic devices 116A-116N, such as when the devices modify data from sensors before sending it to the PPA 112 or when the devices provide other types of data 122 that does not originate from a sensor) is sent to the PPA 112 (e.g., to an endpoint of the provider network 100 associated with the PPA 112). As described above, this data 122 is indicated as being of a first "type" that may not be of the same "type" as accepted by the one or more ML models. The data 122 may comprise a stream of data elements, such as a video stream, audio stream, alphanumeric data (e.g., a string-based representation of a temperature), etc.

At circle '3', the PPA 112 can preprocess the data 122 to convert it into the type(s) of data accepted by the previously-indicated one or more ML models 102A-102C—e.g., data 124 of a second type for a first ML model 102A, and optionally data 126 of a third type for a second ML model 102B and data 128 of a fourth type for a third ML model 102C and so on. To preprocess the data 122, the PPA 112 can identify what which one or more ML models the data 122 is to be preprocessed for, determine what input data characteristics are accepted by the model(s), and convert the data 122 into the needed types using techniques known to those of skill in the art.

For example, a user may seek to use a first ML model 102A that runs using images as input data (e.g., data 124 is to be image data of a particular format) and also seek to use another ML model 102B that runs using audio data as input data (e.g., data 126 is to be audio data of a particular format)

using sensor-generated data 122 that is a video stream. The PPA 112, upon receipt of the video data 122, can strip the video stream into image data for the first model 102A and strip the audio data for the second model 102B, and possibly convert/transform this stripped image data and/or audio data (to yield data 124 and data 126, respectively) so that it conforms to the particular input characteristics (e.g., size/type of image) of the models 102A-102B and then at circle '4' send this data 124/126 on to the ML model(s) for inference. Thus, a same input stream of data 122 may be fed to multiple ML models that perform different inference tasks or attempt to perform a same task but using different characteristics of input data, without needing a user to implement a transformation for each of these four different models, use these transformations to generate four different "types" of the data, and manually send these off to the four models for inference.

In some embodiments, the PPA 112 can further, as a part of preprocessing, perform a filtering or cleaning of the data 122. As one example, input data 122 generated by an electrocardiogram (ECG) sensor 118A might have some introduced noise (e.g., coming from power mains), and depending on the ML model's accepted input type, the PPA 112 may clean the data of introduced noise. For example, in some embodiments, the PPA 112 can implement adaptive filtering to filter out noise from the main input source that the PPA 112 can learn (e.g., by minimizing loss function). Accordingly, the PPA 112 can "learn" the clean frequency of ECG data, which is different than noise frequency, and can then start eliminating that noise during preprocessing. Such filtering can be especially beneficial where sensors are often exposed to noise, such as with many medical type sensors where their output is frequently muddled with various sources of noise. Moreover, some embodiments implementing such filtering can beneficially improve the ability to implement sensor fusion. If multiple streams of data from multiple sensors are needing to be utilized, there may be a lot more noise coming through, which would effectively get amplified if it were not filtered by the PPA 112.

Notably, embodiments thus do not need to utilize a one-to-one mapping between a particular electronic device and a model (where input from the device would be specifically transformed into another type for a particular model). Instead, in some embodiments the PPA 112 can implement a one-to-many mapping (in which a particular device 116A can provide data for multiple heterogeneous ML models have heterogeneous input data characteristics) or even implement a many-to-many mapping.

Moreover, as shown in FIG. 1, the input data 122 can be originated by multiple devices—e.g., a security camera electronic device 116 that generates and sends only visual (video) data, a separate microphone electronic device 116N that generates audio data, etc.—and these multiple streams can be preprocessed individually and sent to different models, or "merged" together into an audiovisual format accepted by a particular ML model.

As described above, there are many different ways the PPA 112 can be adapted to determine the necessary input data characteristics of ML models in different embodiments. For further detail regarding some of these techniques, we turn to FIG. 2, which is a diagram illustrating an environment for input adaptation from disparate data sources for heterogeneous machine learning model execution using user-specific transformation configuration data 204 according to some embodiments.

In this figure, a user 200 may use an electronic device 202 (e.g., a personal computer such as a desktop or laptop, a tablet, smart phone, or other mobile device, etc.) to send a message including configuration data 204 at circle '1' to the PPA 112. This message may be sent within the request described above with regard to FIG. 1, and may include identifiers of one or more ML models (e.g., names of models within a machine learning service, resource identifiers, etc.) and may further specify the particular input data characteristics accepted by the one or more ML models. This message may be sent by the electronic device 202 issuing an API call to an endpoint or sending a command over a network connection (e.g., a shell command via a remote connection), and may or may not be issued responsive to the user 200 utilizing a management console (e.g., of a provider network including the PPA 112, or of the PPA 112). This message can be received and processed by a configuration engine 206 of the PPA 112, which can cause a transformer 208 module (implemented using software and/or hardware) to "know" how to convert data into the necessary data to be provided to the desired ML models 102. Optionally, the PPA 112 may also respond with a response message (responding to the message carrying the configuration data 204) indicating an endpoint to which the data 122 to be preprocessed should be sent. Thus, at optional circle '2', the electronic device 202 may provide the endpoint information to the electronic device 116A to cause the data 122 (of a first type—e.g., audiovisual or "video" data) at circle '3' to be sent to the PPA 112.

At circle '4', using the user-specified configuration data 204 identifying what types of input data the ML models 102A-102C accept, the transformer 208 can convert or transform the data 122 into a second type of data 124 (e.g., image data) for a first ML model 102A, a third type of data 126 (e.g., audio data) for a second ML model 102B, and a fourth type of data 128 (e.g., audiovisual data having a different type, such as a different size, rate, etc.) for a third ML model 102C. As another example, if one model accepts images as input data and another model accepts audio input data, and if an input stream coming from the sensor(s) is a video stream, the transformer 208 can function as an automatic "splitter" that can generate the visual data and the audio data—possibly in different formats than they existed in the input stream—and provide them to the two models. Various software and/or hardware modules and libraries are known to those of skill in the art for making such conversions between data types. In some cases, it may be possible that mismatches may occur between the input data 122 coming from the sensor(s) 118A and the types of data to be provided to the ML models. Embodiments can handle these scenarios in a variety of manners depending upon the particular use case—for example, the transformer 208 could perform some sort of conversion (e.g., padding, stretching, or other enlargement of a "smaller" data 122 into a "larger" accepted input data size), and/or send an error/warning message to the electronic device 202 of the user 200 to describe a problem or mismatch, seek confirmation on how to address the mismatch, etc. At circles '5', '6', and '7', the PPA 112 may provide the data 124/126/128 to the ML models 102A-102C for inference.

Figure 3:
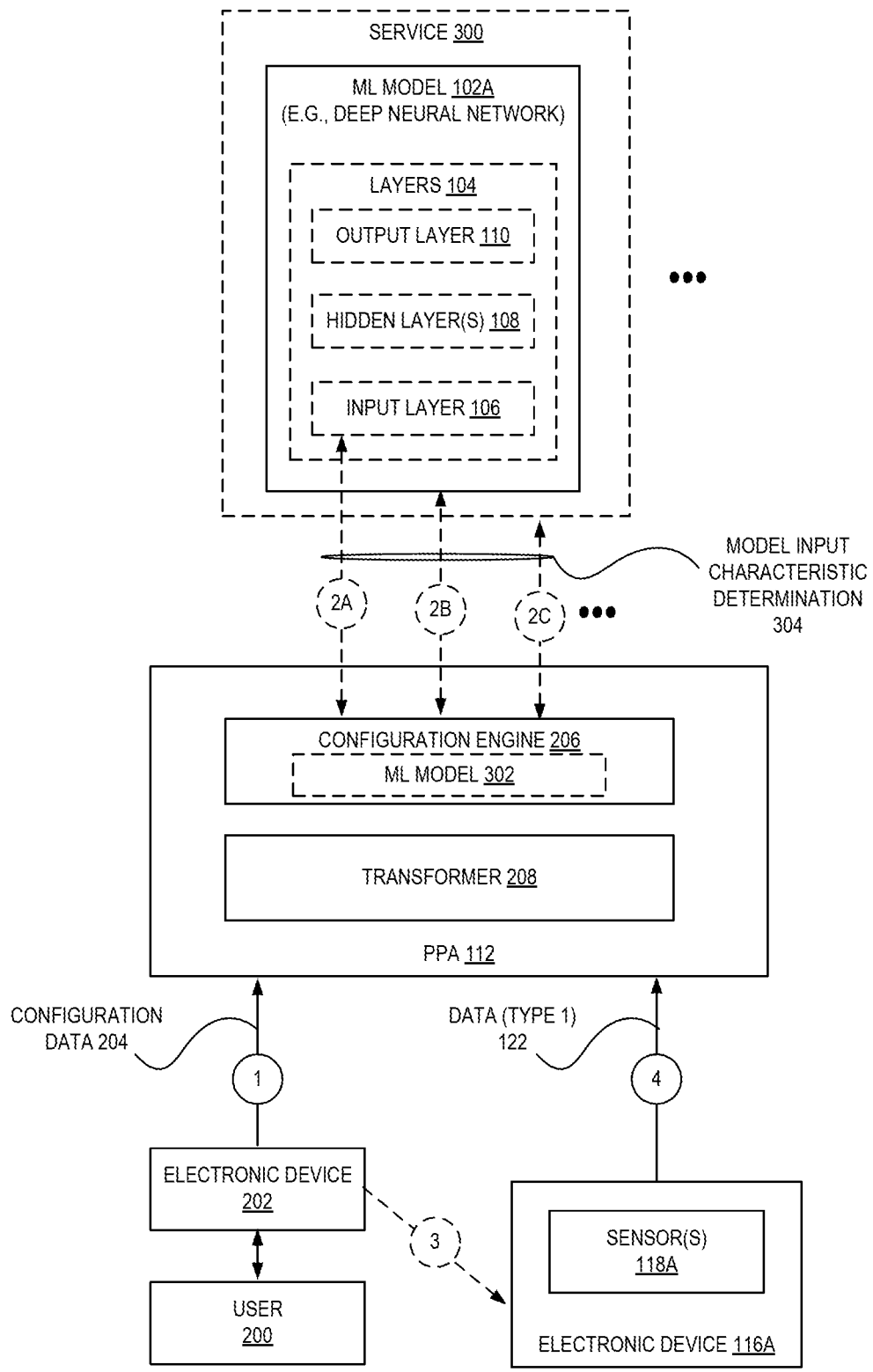
FIG. 3 is a diagram illustrating an environment for input adaptation from disparate data sources for heterogeneous machine learning model execution using automatic ML model input data characteristic discovery according to some embodiments.

Additional techniques for determining input data characteristics are presented in FIG. 3, which is a diagram illustrating an environment for input adaptation from disparate data sources for heterogeneous machine learning model execution using automatic ML model input data characteristic discovery according to some embodiments. In some embodiments, the configuration data 204 may not specify the particular input data characteristics accepted by the one or more ML models. Instead, the configuration engine 206 of the PPA 112 may perform model input characteristic determination 304 operations as represented by circle '2A' and/or '2B' and/or '2C'.

For example, as shown by circle '2A', embodiments can analyze the first input layer 106 of a ML model 102A (e.g., identified in the configuration data 204) to identify the input characteristic requirements of the model, and thus, the user beneficially doesn't need to know the specifics of the model's architecture. In some embodiments, the PPA 112 can interact with the ML model by looking into the data structures of the first input layer 106 of the model to identify, e.g., what dimensions of an image are required (e.g., a line of data of the input layer may read "input=30×30" and thus, it can be determined that the model requires a 30 pixel by 30 pixel image as input data). By looking into this first input layer, the configuration engine 206 can learn what is required in terms of preprocessing.

As another example, at circle '2B' the configuration engine 206 can interact with other aspects of the ML model 102A to determine the accepted input data characteristics. For example, the configuration engine 206 can be configured with logic for determining how to identify input characteristics for certain models built using certain frameworks (e.g., TensorFlow, MXNet, Caffe, PyTorch, etc.), as many ML frameworks have well-defined ways to define the input data characteristics—e.g., the configuration engine 206 can look into a particular line or region of a configuration file to find an input parameter describing the input data that it accepts and operates upon. In some embodiments, the user (e.g., as part of configuration data 204) may specify what framework a model uses, or the configuration engine 206 can look into the ML framework to identify its prefixes and thus understand what language it is. For example, the TensorFlow framework uses a "tf." prefix (for its methods/classes/etc., such as "tf.string_to_number( )", "tf.nn.rule( )", etc.), and if this prefix is recognized by the configuration engine 206, it now "knows" how to determine the input data characteristics (e.g., by looking into particular data structures/locations used by the framework to specify input data characteristics.

Further, at circle '2C', some embodiments can interact with a service 300 (e.g., a machine learning service that hosts the model 102A) to determine the input data characteristics for the model. As one example, the configuration engine 206 may be able to issue a query for the needed characteristics to the service 300 and receive a response with those characteristics. As another example, the service 300 may host or provide some published metadata describing the model that the configuration engine 206 can obtain and analyze.

In some embodiments, the configuration engine 206 may include a ML model 302 of its own for use in determining what input data characteristics are accepted by a model. For example, with regard to FIG. 3, the model 302 can be a simple model (e.g., a simple perceptron-based neural network model) that is trained using a corpus of as input data (e.g., configuration data, input layer 106 data, etc.) obtained from various ML models, and thus the configuration engine 206 can obtain such data from the ML model 102A and use it as input data for the ML model 302 to infer what the best input data characteristics are. However, more sophisticated ML models 302 can also be used as described with regard to FIG. 4.

In some embodiments, a user does not need to specifically identify (e.g., as part of configuration data 204) the type of data 122 coming from the electronic device 116A. For example, upon one or more initial elements (e.g., frames) of the data (e.g., stream) arriving, the PPA 112 can test/analyze it against known characteristics (optionally with help of knowing what it is supposed to convert it to in terms of the models) to identify what type it is. Thus, in some cases, a user can simply indicate to the PPA 112 what model(s) the user wishes to use—and not, perhaps provide details on what that model is expecting, or even what type of data 122 the user will provide to the adapter.

In some embodiments, the PPA 112 may utilize some caching, such as if the user desires simultaneous rendering across multiple models. For example, if the PPA 112 needs to preprocess data for three different models and thus needs to change the data into multiple types (e.g., one video, one audio, one image), it can hold the elements of the data 122 stream while it performs the processing.

Figure 4:
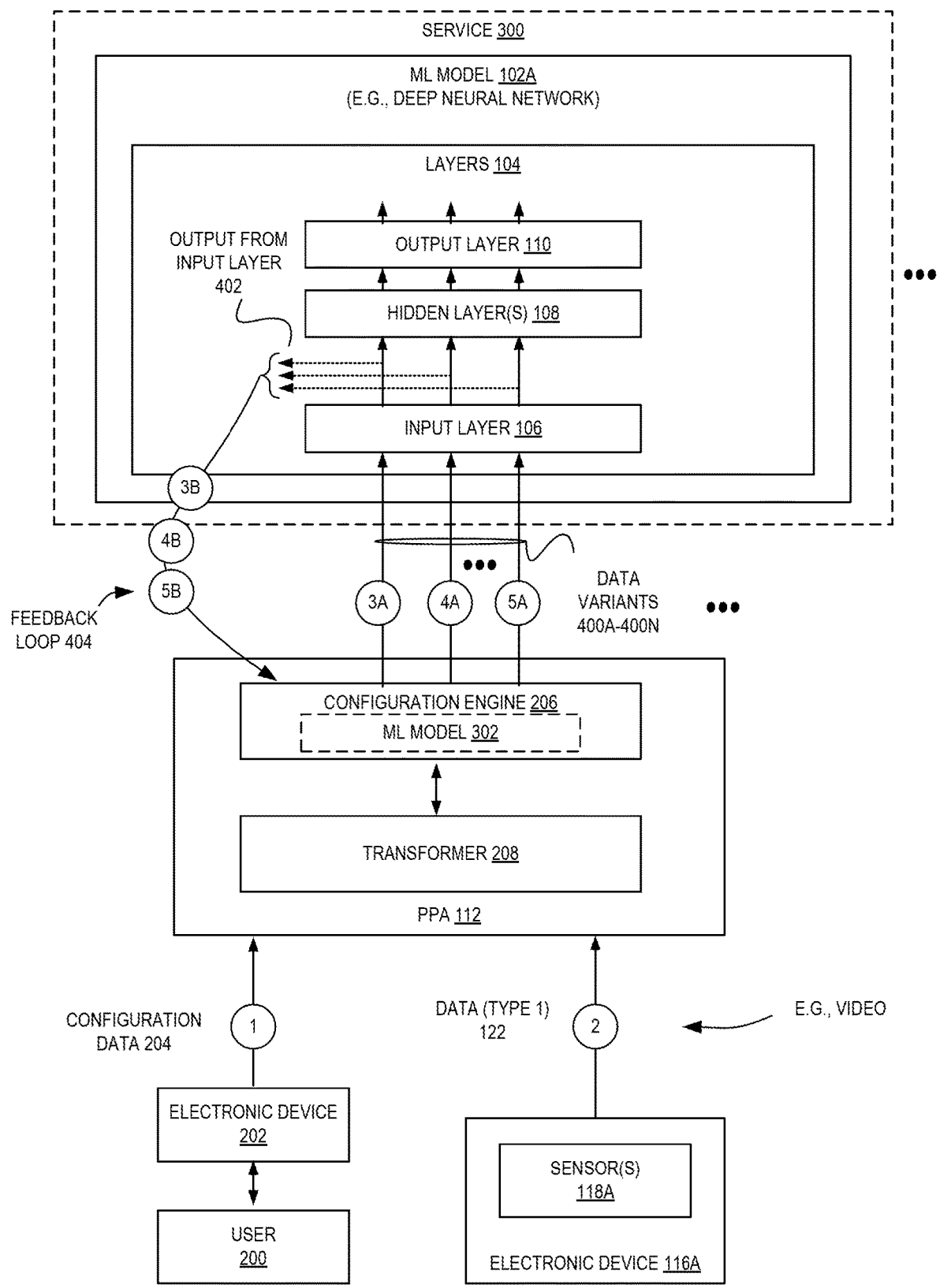
FIG. 4 is a diagram illustrating an environment for input adaptation from disparate data sources for heterogeneous machine learning model execution using feedback-based ML model input data characteristic discovery according to some embodiments.

Additional techniques for determining input data characteristics are presented in FIG. 4, which is a diagram illustrating an environment for input adaptation from disparate data sources for heterogeneous machine learning model execution using feedback-based ML model input data characteristic discovery according to some embodiments. In FIG. 4, the configuration engine 206 may include a "smart" ML model 302 that can get feedback from the ML model(s) 102 as part of a feedback loop 404 to train itself.

For example, in some embodiments the configuration engine 206 can learn by sending data variants 400A-400N having different characteristics to the model 102A. For example, a user 200 may specify a "resource" for a desired ML model 102A to use (e.g., a resource identifier, such as a location of a model in a storage location provided by a storage virtualization service), the configuration engine 206 may optionally attempt to perform techniques shown in FIG. 3 to determine the input data characteristics of the model. If the particular input data characteristics are not clearly defined (and/or cannot be discovered), the adapter can send variants of the data 122 using different characteristics at circles 3A/4A/5A, and then monitor the output 402 from the first layer of the model 102A as feedback 404 (at circles 3B/4B/5B) to "tune" itself. The configuration engine 206 can modify the type of the data using a trial and error process to minimize the "delta loss" (i.e., to increase the accuracy) between the data variant that went into the ML model 102A and the output 402 of the first layer resulting from each data variant. For example, in many cases, it is known how to "slice" the layers of a ML model to obtain the outputs of the input layer 106 of the model, and thus, the configuration engine 206 can get the delta between the input and output of the layer to obtain a "loss" value, and then iteratively try to minimize the loss by changing the characteristics of the data.

For example, the configuration engine 206 may determine that the input data for a model is audio (e.g., using one or more techniques from FIG. 2 and/or FIG. 3), but may not determine a particular hertz for the audio. Thus, the configuration engine 206 could send data at a particular hertz (e.g., 50 Hz) and observe the output 402 (e.g., a numeric value computed by the layer) to obtain a loss function. If the resulting loss function is too high (i.e., accuracy is too low), the configuration engine 206 could send another data variant that is decreased or increased by a few hertz, e.g., following the idea of gradient descent to try different versions to minimize the loss function. Notably, this concept is not being used for machine learning itself, but is being applied to learn how to send input data for a ML model—i.e., the input data characteristics of the model. Thus, in some embodiments, the configuration engine 206 can try multiple variants until the loss function is appropriate, e.g., to find a local minimum for the loss function.

As another example, the configuration engine 206 can also determine a rate of input data that a model can accommodate using feedback loop 404 based techniques. For example, with a model accepting video input data, the configuration engine 206 may use other techniques (e.g., of FIGS. 2-3) to determine that the model accepts 300-by-300 pixel video input data, but still not determine what frame rate the input stream is accepted at. The configuration engine 206 can learn, via this feedback loop 404 mechanism, the speed (throughput) at which the model is consuming data, and can thereafter slice the video stream accordingly. Such determinations are particularly useful as a same model can process data at different rates based on the type of host device the model executes upon. For example, a same image model could run on a first type of compute instance that can handle 120 frames per second (fps), while the same model may only be 20 fps when running on another type of compute instance. Accordingly, the PPA 112 can probe for an optimal frame rate and learn how to slice incoming frames at the proper rate for a particular model running on a particular compute instance.

Accordingly, embodiments can use feedback to tune a rate of input data to be provided to models, the type(s) of input data characteristics to be provided to models, etc.

Figure 5:
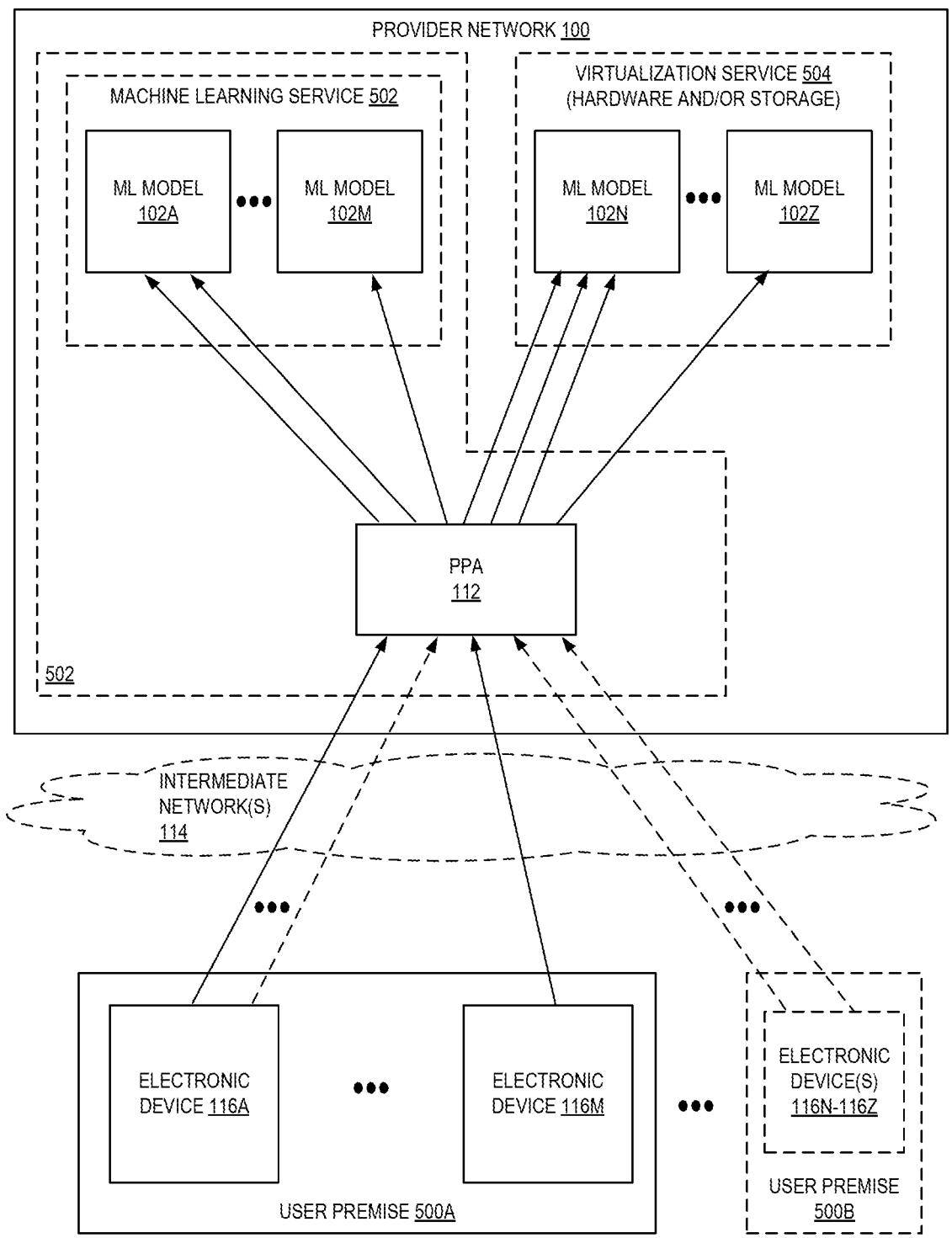
FIG. 5 is a diagram illustrating an exemplary provider network environment including a preprocessing adapter for input adaptation from disparate data sources for heterogeneous machine learning model execution according to some embodiments.

FIG. 5 is a diagram illustrating an exemplary provider network environment including a preprocessing adapter for input adaptation from disparate data sources for heterogeneous machine learning model execution according to some embodiments. In FIG. 5, the PPA 112 and multiple ML models 102A-102Z are deployed within a provider network 100, and multiple electronic devices 116A-116Z are deployed in multiple user premises 500A-500B. In this example, some of the ML models 102A-102M can optionally be provided by a machine learning service 502 that trains and executes models, while others of the ML models 102N-102Z are provided by (or stored in) a virtualization service 504 such as a hardware virtualization service or storage virtualization service. Additionally, in some embodiments the PPA 112 may operate as part of a machine learning service 502 (as shown with dashed lines) or as part of a virtualization service 504 and thus may not appear as a distinct entity to users.

Figure 6:
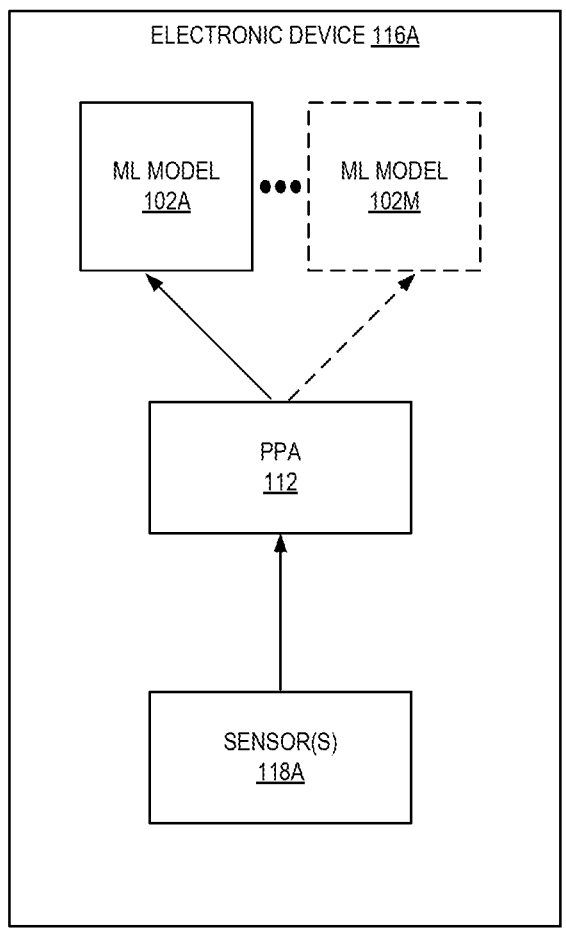
FIG. 6 is a diagram illustrating an environment including an electronic device implementing a preprocessing adapter for input adaptation for heterogeneous machine learning model execution according to some embodiments.

FIG. 6 is a diagram illustrating another environment including an electronic device implementing a preprocessing adapter for input adaptation for heterogeneous machine learning model execution according to some embodiments. In this example, the PPA 112 and one or more ML models 102A-102M are part of the electronic device 116A having the sensor(s) 118A generating the data. In this case, one or more of the ML models 102 may be "generic" models not specifically generated for the electronic device 116A or models generated for other types of devices having different types of data to be used as inputs to the models, and thus may be downloaded onto the electronic device 116A from a third-party system such as a provider network, created by the user or another user, etc.

Figure 7:
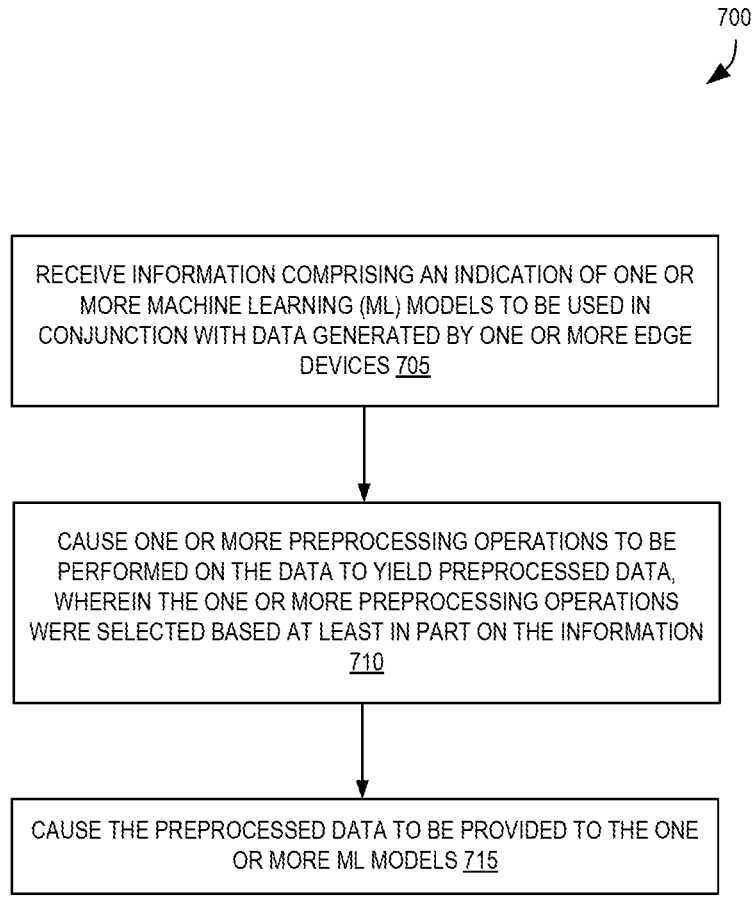
FIG. 7 is a flow diagram illustrating operations for input adaptation for machine learning model execution according to some embodiments.

FIG. 7 is a flow diagram illustrating operations for input adaptation for machine learning model execution according to some embodiments. Some or all of the operations 700 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 700 are performed by the PPA 112 of the other figures.

The operations 700 include, at block 705, receiving information comprising an indication of one or more ML models to be used in conjunction with data generated by one or more edge devices. The information may be received in a message sent by an electronic device of a user to an API endpoint of a provider network. The information may further comprise an indication, for each of the one or more ML models, of input data characteristics accepted by the corresponding ML model. The information may include names of the ML model(s), resource identifiers (e.g., URLs, URIs, paths) of the ML models(s), identifiers of the framework utilized by the ML model, etc. The one or more ML models may be within a provider network, or deployed to the one or more edge devices.

At block 710, the operations 700 include causing one or more preprocessing operations to be performed on the data to yield preprocessed data, wherein the one or more preprocessing operations were selected based at least in part on the information. In some embodiments, the one or more preprocessing operations were selected based on identifying input data characteristics of the ML model(s) specified within the information, and the one or more preprocessing operations are performed to generate input data having those input data characteristics from provided data. In some embodiments, the one or more preprocessing operations were selected based on analyzing data structures of the ML model(s)—such as configuration files and/or a first layer of the ML model(s)—to identify the input data characteristics of the ML model(s), after identifying these ML model(s) based on the indication of the one or more ML models in the information. In some embodiments, the one or more preprocessing operations were selected based on identifying the input data characteristics of the ML model(s) via analysis of feedback generated by the ML model(s) after providing multiple input data variants to the ML model(s) as input. The one or more preprocessing operations can include converting a first type of data (e.g., audiovisual) into another one or more types (e.g., audio only data, image only data), filtering the data to remove noise, filtering elements of the data stream to result in a data stream being provided to the ML model(s) at a determined rate, modifying the data (e.g., zooming, stretching, and/or expanding image data), etc.

The operations 700 include, at block 715, causing the preprocessed data to be provided to the one or more ML models. In some embodiments, the preprocessed data is sent over one or more networks to the ML model(s), and in some embodiments the preprocessed data is placed in a storage location to be input to the ML model(s), while in other embodiments the preprocessed data is provided as an argument to an invocation of the ML model(s).

Figure 8:
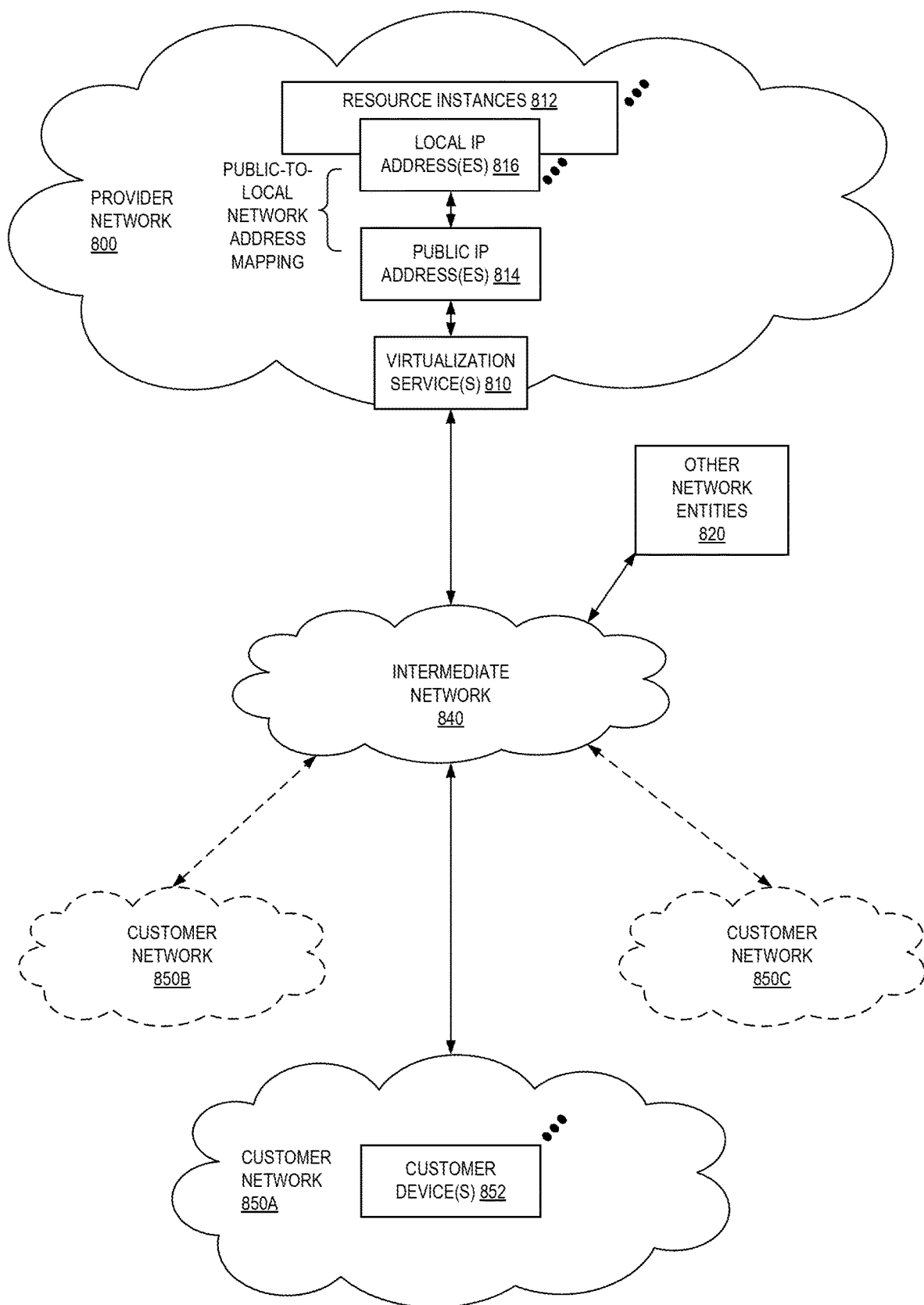
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
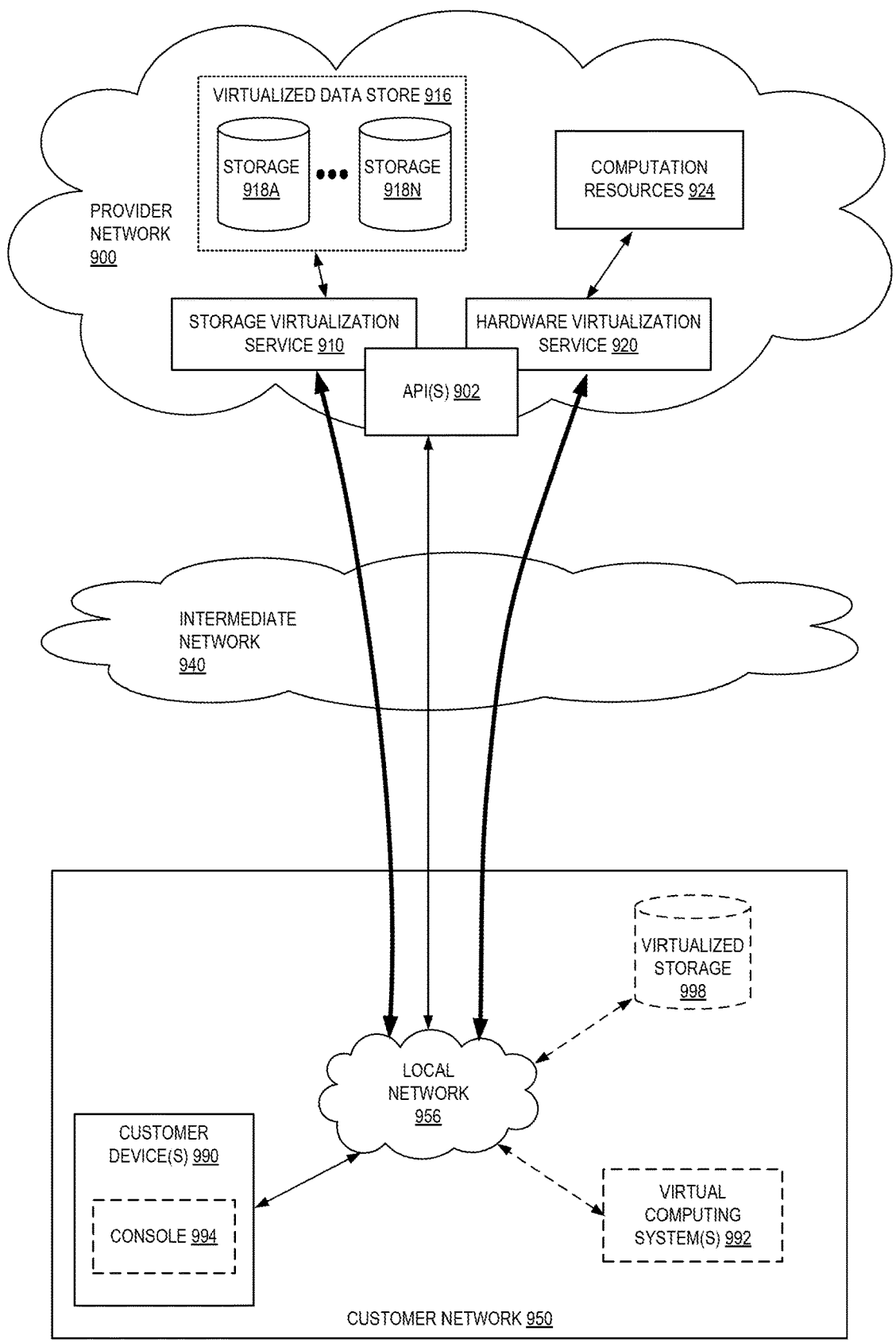
FIG. 9 is a block diagram of an example provider network that provides a storage virtualization service and a hardware virtualization service to customers according to some embodiments.

FIG. 9 is a block diagram of an example provider network that provides a storage virtualization service and a hardware virtualization service to customers, according to some embodiments. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage virtualization service 910, for example via one or more APIs 902, to access data from and store data to storage resources 918A-918N of a virtual data store 916 provided by the provider network 900. In some embodiments, a virtualized data store gateway (not shown) may be provided at the customer network 950 that may locally cache at least some data, for example frequently accessed or critical data, and that may communicate with virtualized data store service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes, which appear to the user as local virtualized storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Illustrative System

Figure 10:
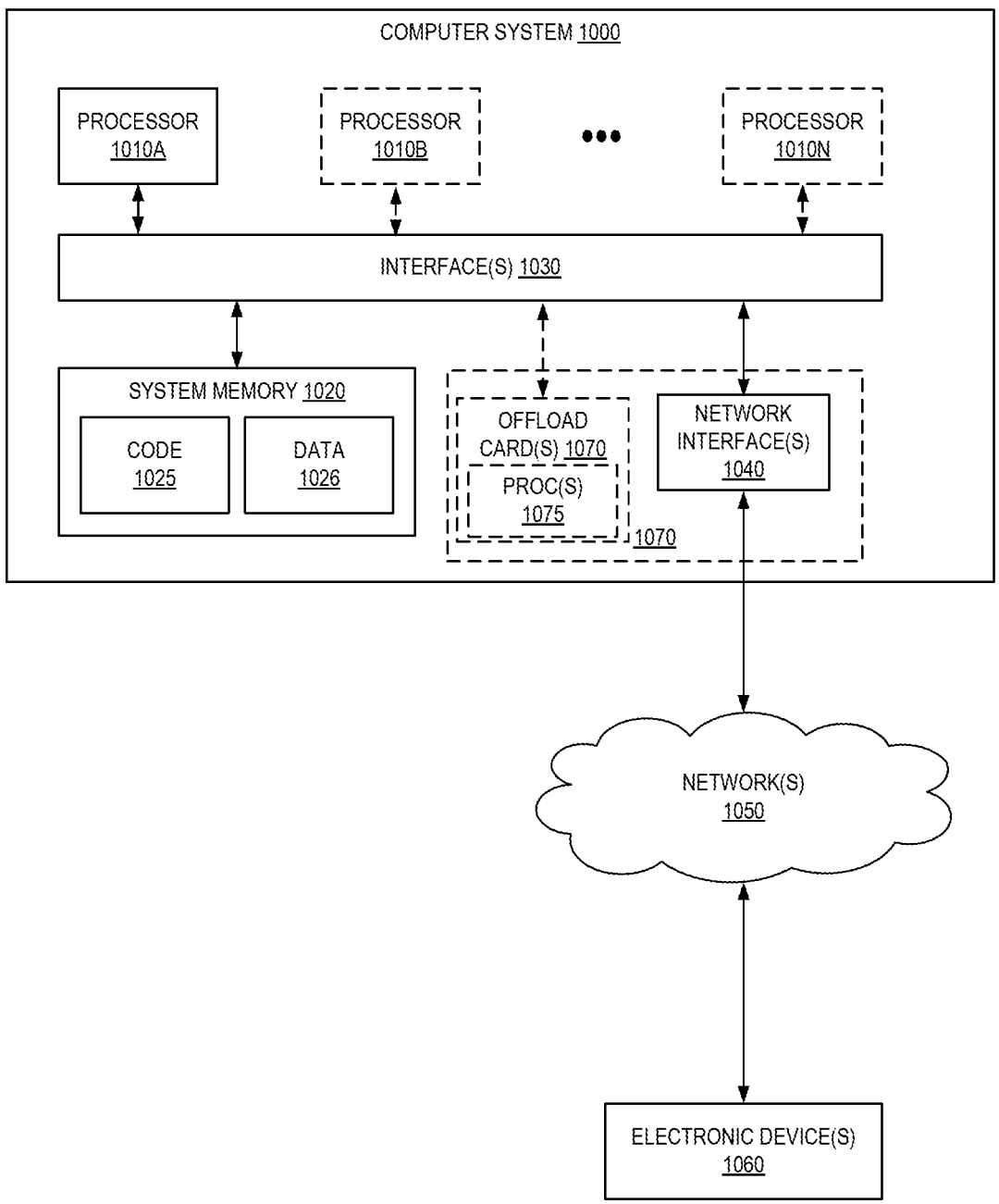
FIG. 10 is a block diagram illustrating an example computer system that may be used in some embodiments.

In some embodiments, a system that implements a portion or all of the techniques for input adaptation from disparate data sources for heterogeneous machine learning model execution as described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 1020 as code 1025 and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example.

Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070 (including one or more processors 1075, and possibly including the one or more network interfaces 1040) that are connected using an I/O interface 1030 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 1000 may act as a host electronic device (e.g., operating as part of a hardware virtualization service) that hosts compute instances, and the one or more offload cards 1070 execute a virtualization manager that can manage compute instances that execute on the host electronic device. As an example, in some embodiments the offload card(s) 1070 can perform compute instance management operations such as pausing and/or un-pausing compute instances, launching and/or terminating compute instances, performing memory transfer/copying operations, etc. These management operations may, in some embodiments, be performed by the offload card(s) 1070 in coordination with a hypervisor (e.g., upon a request from a hypervisor) that is executed by the other processors 1010A-1010N of the computer system 1000. However, in some embodiments the virtualization manager implemented by the offload card(s) 1070 can accommodate requests from other entities, and may not coordinate with (or service) any hypervisor.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Figure 11:
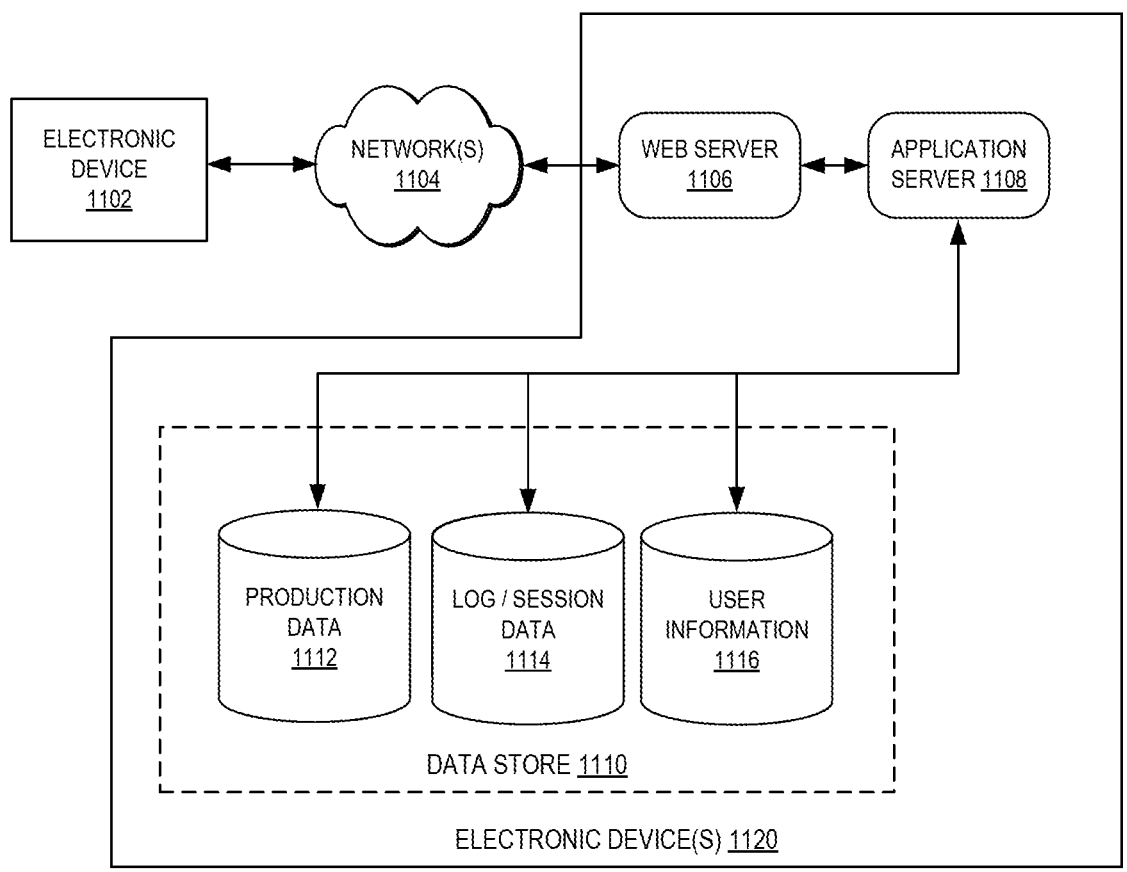
FIG. 11 illustrates an example of an environment for implementing aspects in accordance with various embodiments.

As discussed, different approaches can be implemented in various environments in accordance with the described embodiments. For example, FIG. 11 illustrates an example of an environment 1100 for implementing aspects in accordance with various embodiments. For example, in some embodiments messages carrying configuration data 204 are HyperText Transfer Protocol (HTTP) requests that are received by a web server (e.g., web server 1106), and the users, via electronic devices, may interact with the provider network via a web portal provided via the web server 1106 and application server 1108. As will be appreciated, although a web-based environment is used for purposes of explanation, different environments may be used, as appropriate, to implement various embodiments. The system includes an electronic client device 1102, which may also be referred to as a client device and can be any appropriate device operable to send and receive requests, messages or information over an appropriate network 1104 and convey information back to a user of the device 1102. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1104 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1104 includes the Internet, as the environment includes a web server 1106 for receiving requests and serving content in response thereto, although for other networks an alternative device serving a similar purpose could be used, as would be apparent to one of ordinary skill in the art.

The illustrative environment includes at least one application server 1108 and a data store 1110. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device 1102 and handling a majority of the data access and business logic for an application. The application server 1108 provides access control services in cooperation with the data store 1110 and is able to generate content such as text, graphics, audio, video, etc., to be transferred to the client device 1102, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1102 and the application server 1108, can be handled by the web server 1106. It should be understood that the web server 1106 and application server 1108 are not required and are merely example components, as structured code discussed herein can be executed on any appropriate device or host machine as discussed elsewhere herein.

The data store 1110 can include several separate data tables, databases, or other data storage mechanisms and media for storing data relating to a particular aspect. For example, the data store illustrated includes mechanisms for storing production data 1112 and user information 1116, which can be used to serve content for the production side. The data store 1110 also is shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update, or otherwise process data in response thereto. In one example, a user might submit a search request for a certain type of item. In this case, the data store 1110 might access the user information 1116 to verify the identity of the user and can access a production data 1112 to obtain information about items of that type. The information can then be returned to the user, such as in a listing of results on a web page that the user is able to view via a browser on the user device 1102. Information for a particular item of interest can be viewed in a dedicated page or window of the browser.

The web server 1106, application server 1108, and/or data store 1110 may be implemented by one or more electronic devices 1120, which can also be referred to as electronic server devices or server end stations, and may or may not be located in different geographic locations. Each of the one or more electronic devices 1120 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the environment 1100 in FIG. 11 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 102A-102C, 116A-116N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving information comprising one or more indications of a plurality of machine learning (ML) models to be used in conjunction with data generated by one or more electronic devices;
analyzing, by a preprocessing adapter executing code using one or more processors, a data structure of an input layer of a first ML model of the plurality of ML models, the analyzing comprising:
generating a plurality of test data elements of a plurality of types;
providing the plurality of test data elements to the first ML model as input data;
receiving a plurality of outputs of the input layer of the first ML model resulting from the providing of the plurality of test data elements to the first ML model;
determining a plurality of loss values based on the plurality of outputs of the input layer of the first ML model;
identifying, as a type of input data accepted by the first ML model, a type of a test data element of the plurality of test data elements that resulted in a lowest loss value of the plurality of loss values; and
determining, by the preprocessing adapter based at least in part on the identifying of the type of the test data element that resulted in the lowest loss value, a first set of one or more preprocessing operations to be performed on the data generated by the one or more electronic devices to yield first preprocessed data of a first type accepted by the first ML model;
performing, by the preprocessing adapter, the first set of preprocessing operations and a second set of preprocessing operations on the data to yield the first preprocessed data of the first type and second preprocessed data of a second type; and
causing the first preprocessed data of the first type to be provided to the first ML model and the second preprocessed data of the second type to be provided to a second ML model.

2. The computer-implemented method of claim 1, wherein:
the data generated by the one or more electronic devices comprises one or more elements of one or more audio-visual streams;
the first preprocessed data of the first type comprises image data; and
the second preprocessed data of the second type comprises audio data.

3. The computer-implemented method of claim 1, further comprising analyzing a data structure of an input layer of the second ML model, wherein the determining, for the second ML model, of the second set of one or more preprocessing operations to be performed on the data to yield the second preprocessed data of the second type is based at least in part on the analyzing of the data structure of the input layer of the second ML model.

4. A computer-implemented method comprising:
receiving information comprising an indication of one or more machine learning (ML) models to be used in conjunction with data generated by one or more electronic devices;
analyzing, by a preprocessing adapter executing code using one or more processors, a data structure of an input layer of a first ML model of the one or more ML models, the analyzing comprising:
generating a plurality of test data elements of a plurality of types;
providing the plurality of test data elements to the first ML model as input data;
receiving a plurality of outputs of the input layer of the first ML model resulting from the providing of the plurality of test data elements to the first ML model;
determining a plurality of loss values based on the plurality of outputs of the input layer of the first ML model;
identifying, as a type of input data accepted by the first ML model, a type of a test data element of the plurality of test data elements that resulted in a lowest loss value of the plurality of loss values; and
determining, by the preprocessing adapter based at least in part on the identifying of the type of the test data element that resulted in the lowest loss value, one or more preprocessing operations to be performed on the data generated by the one or more electronic devices;
performing, by the preprocessing adapter, the one or more preprocessing operations on the data generated by the one or more electronic devices to yield preprocessed data of the type accepted by the first ML model; and
causing the preprocessed data of the type accepted by the first ML model to be provided to the first ML model.

5. The computer-implemented method of claim 4, wherein:
the indication is for a plurality of ML models; and
a first one or more preprocessing operations of the one or more preprocessing operations are performed for a first ML model of the one or more ML models to yield a first portion of the preprocessed data of a type accepted by the first ML model; and
a second one or more preprocessing operations of the one or more preprocessing operations are performed for a second ML model of the one or more ML models to yield a second portion of the preprocessed data of a type accepted by the second ML model.

6. The computer-implemented method of claim 5, wherein:
the data generated by the one or more electronic devices comprises an audio-visual stream;
the first portion of the preprocessed data of the type accepted by the first ML model comprises image data to be provided to the first ML model; and
the second portion of the preprocessed data of the type accepted by the second ML model comprises audio data to be provided to the second ML model.

7. The computer-implemented method of claim 4, further comprising analyzing a data structure of an input layer of another ML model of the one or more ML models.

8. The computer-implemented method of claim 7, further comprising:
determining, based at least in part on the analyzing of the data structure of the input layer of the another ML model, one or more other preprocessing operations to be performed on the data;

causing the one or more other preprocessing operations to be performed on the data to yield other preprocessed data of a type accepted by the another ML model; and causing the other preprocessed data of the type accepted by the another ML model to be provided to the another ML model.

9. The computer-implemented method of claim 4, wherein the preprocessing adapter comprises another ML model.

10. The computer-implemented method of claim 9, wherein the plurality of outputs of the input layer of the first ML model is used as input data for the another ML model to train the another ML model.

11. The computer-implemented method of claim 9, wherein the steps of generating a plurality of test data elements of a plurality of types, providing the plurality of test data elements to the first ML model as input data, receiving a plurality of outputs of the input layer of the first ML model resulting from the providing of the plurality of test data elements to the first ML model, and determining a plurality of loss values based on the plurality of outputs of the input layer of the first ML model comprise the another ML model modifying the plurality of test data elements of a plurality of types using a trial and error process to minimize a delta loss between data variants that were input into the first ML model and the plurality of outputs of the input layer of the first ML model resulting from each of the data variants.

12. The computer-implemented method of claim 4, wherein:
a first portion of the preprocessed data provided to a first ML model of the one or more ML models is provided at a first rate;
a second portion of the preprocessed data provided to the first ML model of the one or more ML models is provided at a second rate; and
the computer-implemented method further comprises determining that additional preprocessed data is to be provided to the first ML model at the second rate.

13. A system comprising:
one or more machine learning (ML) models implemented in a first one or more electronic devices; and
a preprocessing adapter implemented in a second one or more electronic devices, the preprocessing adapter including instructions that upon execution by one or more processors cause the preprocessing adapter to:
receive information comprising an indication of the one or more ML models to be used in conjunction with data generated by one or more electronic devices;
analyze a data structure of an input layer of an ML model of the one or more ML models;
determine, based at least in part on the information, including the one or more identifiers of the one or more types of input data accepted by the one or more ML models, and based at least in part on the analyzing of the data structure of the input layer of the ML model, one or more preprocessing operations to be performed on the data;
perform the one or more preprocessing operations on the data to yield preprocessed data of a type accepted by the ML model; and
cause the preprocessed data of the type accepted by the ML model to be provided to the ML model;
analyzing, by a preprocessing adapter executing code using one or more processors, a data structure of an input layer of a first ML model of the one or more ML models, the analyzing comprising:
generating a plurality of test data elements of a plurality of types;
providing the plurality of test data elements to the first ML model as input data;
receiving a plurality of outputs of the input layer of the first ML model resulting from the providing of the plurality of test data elements to the first ML model;
determining a plurality of loss values based on the plurality of outputs of the input layer of the first ML model;
identifying, as a type of input data accepted by the first ML model, a type of a test data element of the plurality of test data elements that resulted in a lowest loss value of the plurality of loss values; and
determining, by the preprocessing adapter based at least in part on the identifying of the type of the test data element that resulted in the lowest loss value, one or more preprocessing operations to be performed on the data generated by the one or more electronic devices;
performing, by the preprocessing adapter, the one or more preprocessing operations on the data generated by the one or more electronic devices to yield preprocessed data of the type accepted by the first ML model; and
causing the preprocessed data of the type accepted by the first ML model to be provided to the first ML model.

14. The system of claim 13, wherein:
the indication is for a plurality of ML models; and
a first one or more preprocessing operations of the one or more preprocessing operations are performed for a first ML model of the one or more ML models to yield a first portion of the preprocessed data of a type accepted by the first ML model; and
a second one or more preprocessing operations of the one or more preprocessing operations are performed for a second ML model of the one or more ML models to yield a second portion of the preprocessed data of a type accepted by the second ML model.

15. The system of claim 14, wherein:
the data generated by the one or more electronic devices comprises an audio-visual stream;
the first portion of the preprocessed data of the type accepted by the first ML model comprises image data to be provided to the first ML model; and
the second portion of the preprocessed data of the type accepted by the second ML model comprises audio data to be provided to the second ML model.

16. The system of claim 13, wherein the instructions when executed by the one or more processors further cause the preprocessing adapter to analyze a data structure of an input layer of another ML model of the one or more ML models.

17. The system of claim 16, wherein the instructions when executed by the one or more processors further cause the preprocessing adapter to:
determine, based at least in part on the analyzing of the data structure of the input layer of the another ML model, one or more other preprocessing operations to be performed on the data;
cause the one or more other preprocessing operations to be performed on the data to yield other preprocessed data of a type accepted by the another ML model; and
cause the other preprocessed data of the type accepted by the another ML model to be provided to the another ML model.

18. The system of claim 13, wherein:
a first portion of the preprocessed data provided to a first ML model of the one or more ML models is provided at a first rate;
a second portion of the preprocessed data provided to the first ML model of the one or more ML models is provided at a second rate; and
the instructions when executed by the one or more processors further cause the preprocessing adapter to determine that additional preprocessed data is to be provided to the first ML model at the second rate.

19. The system of claim 13, wherein the preprocessing adapter comprises another ML model.

20. The system of claim 19, wherein the plurality of outputs of the input layer of the first ML model is used as input data for the another ML model to train the another ML model.

* * * * *